United States Patent

[11] 3,621,412

[72] Inventors Richard W. Keeling, deceased
late of Houston by Katie Vee Keeling, executrix;
Cecil R. Gilbreath, Houston; Virgil O. Stamps, Houston, all of Tex.
[21] Appl. No. 870,589
[22] Filed Aug. 25, 1969
[45] Patented Nov. 16, 1971
[73] Assignee Geo Space Corporation

[54] METHOD AND APPARATUS FOR SELECTING ACTIVE FILTER SYSTEMS
4 Claims, 4 Drawing Figs.
[52] U.S. Cl. .................................................. 330/107, 330/109, 330/126
[51] Int. Cl. .................................................. H03f 1/36
[50] Field of Search .......................................... 330/21, 31, 107, 51, 109, 126; 328/167; 333/70 R

[56] References Cited
UNITED STATES PATENTS
2,716,733  8/1955  Roark .......................... 330/126 X OTHER REFERENCES
Lloyd, " Linear-Phase Low-Pass Active Filter with Switched Cutoff Frequencies," Electronic Engineering, Feb. 1968, pp. 69–71

*Primary Examiner*—Roy Lake
*Assistant Examiner*—James B. Mullins
*Attorneys*—Michael P. Breston and Alfred B. Levine ABSTRACT: This invention relates to a method and apparatus for seismic signal processing through active filter systems adapted to transmit incoming seismic signals to a recorder in a manner as to attenuate undesired noise and frequencies outside of the band of interest. Each active filter system comprises an active network and a plurality of passive filter networks. Each passive filter network can be connected to the input circuit of the active network independently, or in parallel combination with one or more passive filter networks. Each established connection between a single passive filter network and the active network, or between a parallel combination of passive filter networks and the active network, provides a distinct cutoff frequency without deleteriously affecting the filter's frequency response.

PATENTED NOV 16 1971        3,621,412

Cecil R. Gilbreath,
Virgil O. Stamps,
Richard W. Keeling, deceased
Katie Vee Keeling, Executrix
INVENTORS BY   Michael P. Breston
          ATTORNEY 3,621,412

METHOD AND APPARATUS FOR SELECTING ACTIVE FILTER SYSTEMS

BACKGROUND OF THE INVENTION

In seismic prospecting, the wave energies from seismic detonation penetrate downwardly into the earth and are reflected from underground strata, interfaces, fault planes, etc. The pulses received at monitoring stations are converted into electric signals by means of suitable transducers such as geophones or hydrophones. The electric signals are then amplified and recorded for subsequent processing, analysis and interpretation.

Because reflected pulses undergo considerable attenuation in the course of their travel from the detonation point down to the reflecting earth surfaces and up to the monitoring stations, their amplitudes are frequently not far greater than the amplitudes of background noise.

To improve the signal-to-noise rations, it is necessary in seismic prospecting to employ filter systems, the main purpose of which is to attenuate noise and to enhance the signal bands of interest. Depending on their function, seismic filter systems are commonly known as low-cut, high-cut and band-pass filters.

It has been found from experience that reflection pulses from various layers of the earth have certain characteristic frequencies, usually lying in a frequency spectrum ranging from 5 to 100 Hz. Accordingly a seismic processing system must be provided with selected frequency filters to allow the operator to conveniently process signals from various reflection strata.

Filters were originally formed from passive circuit elements including resistors, capacitors and inductors in combination with suitable termination networks. The filters were made frequency adjustable by varying one or more of the reactive circuit elements and/or plug-in units.

In the past few years seismic filter systems were constructed by using an active network such as a high-gain operational amplifier with negative feedback. Because the seismic frequency spectrum is relatively low, say up to 100 Hz., the preferred reactive circuit elements are condensers rather than inductors.

By the term "frequency characteristic curve" is meant an amplitude-versus-frequency curve for a sinusoidal input signal of constant amplitude. By "substantially flat characteristic curve" is meant a frequency characteristic curve which is substantially flat within the passband of the filter. When a filter has a substantially flat characteristic curve in the passband it is said to have a Butterworth response. By "sharpness of cutoff" is meant the slope or the rate of attenuation (db./octave) of the frequency characteristic curve. By "active filter system" is meant a filter system which includes: an active network such as a high-gain amplifier with negative feedback applied to a passive network formed of resistive and reactive circuit elements.

While it is desired for an a active filter system to be frequency selectable so as to provide different cutoff frequencies, it is also desired that its frequency characteristic curve remain maximally flat as the filter is changed from one cutoff frequency to another.

Prior art active filter systems were provided with a separate and distinct passive network for each selectable cutoff frequency setting. Accordingly a prior art active filter system with a number N of cutoff frequencies required N passive networks, each passive network being independently connectable to the input circuit of the operational amplifier.

Applicants have discovered that a frequency selectable active filter system retains its characteristic response even when the independent passive filter networks are connected in parallel combinations.

SUMMARY OF THE INVENTION

A method of providing an active filter system with selectable cutoff frequencies, the method comprising the steps of: selecting a plurality of independent passive filter networks, each passive network being characterized by a distinct cutoff frequency, and connecting independently and also in various parallel combinations the passive filter networks to the input circuit of the active network.

In accordance with the method and apparatus of the present invention when N independent passive filter networks are employed, it is possible to obtain ($2^N-1$) cutoff frequencies. For example, if N =4 it is possible to obtain fifteen cutoff frequencies, as compared to four cutoff frequencies obtainable with prior art active filter systems.

BRIEF DESCRIPTION OF THE DRAWINGS

Referring to FIG. 1, there is shown a prior art active filter system generally designated as 10, which includes an active network 12 and a plurality of passive filter networks 14, 16 and 18. A single pole switching system 20 separately and independently couples each of the passive networks 14–18 to the active network 12.

Figure 1:
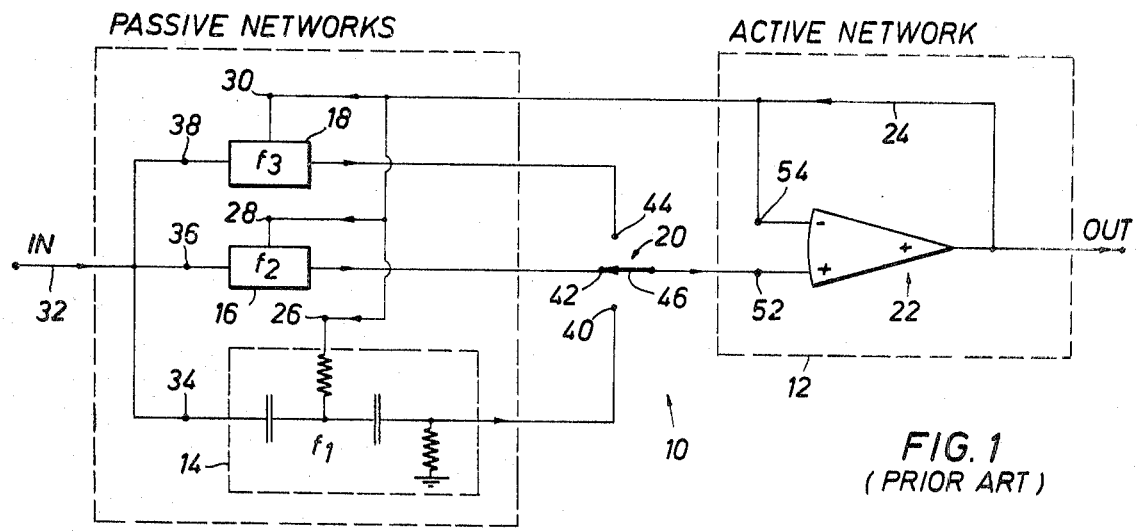
FIG. 1 shows a prior art active filter system for selectively providing distinct cutoff frequencies.

The active network 12 generally includes an operational amplifier 22 having a negative feedback path 24 which is connected to each of networks 14—18 through feedback terminals 26, 28 and 30, respectively. The signals arriving on incoming line 32 are simultaneously applied to input terminals 34, 36 and 38 of networks 14, 16 and 18, respectively. The filtered output signals of networks 14, 16 and 18 are fed to terminals 40, 42 and 44, respectively, of switching system 20.

The single pole switch system 20 has an arm 46 which can separately contact each of terminals 40, 42 and 44. Arm 46 is connected to one input terminal 52 of amplifier 22. Feedback path 24 is connected to the other input terminal 54 of amplifier 22.

Passive filter network 14 is designed so that when it is connected through switch 20 to the operational amplifier 22, the active filter system 10 will have a cutoff frequency $f_1$. Similarly network 16 will provide a cutoff frequency $f_2$, and network 18 will provide a cutoff frequency $f_3$. The manner of selecting the circuit elements forming networks 14–18 is well known in the art. One possible arrangement of the circuit elements is shown for network 14. Desirably the arrangement of the circuit elements in passive networks 14—18 is the same, but the values of certain circuit elements in each of networks 14–18 is changed to yield the same frequency characteristic response but with a different cutoff frequency.

Figure 2:
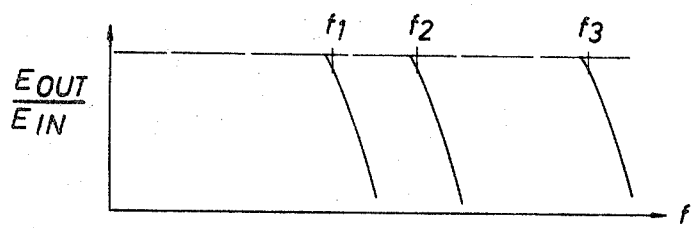
FIG. 2 shows the frequency response curves for the system of FIG. 1.

In carrying out the prior art method for selectively providing distinct cutoff frequencies, switch arm 46 is connected to t terminal 40 to obtain a frequency characteristic curve with a cutoff frequency $f_1$ as shown in FIG. 2; arm 46 is connected to terminal 42 to obtain a frequency characteristic curve with a cutoff frequency $f_2$; and arm 46 is connected to terminal 44 to obtain a frequency characteristic curve with a cutoff frequency $f_3$.

To better illustrate the improvement of the method of this invention over the method of prior art, as shown in FIG. 1, identical reference characters are used throughout the drawings to designate similar parts.

Figure 3:
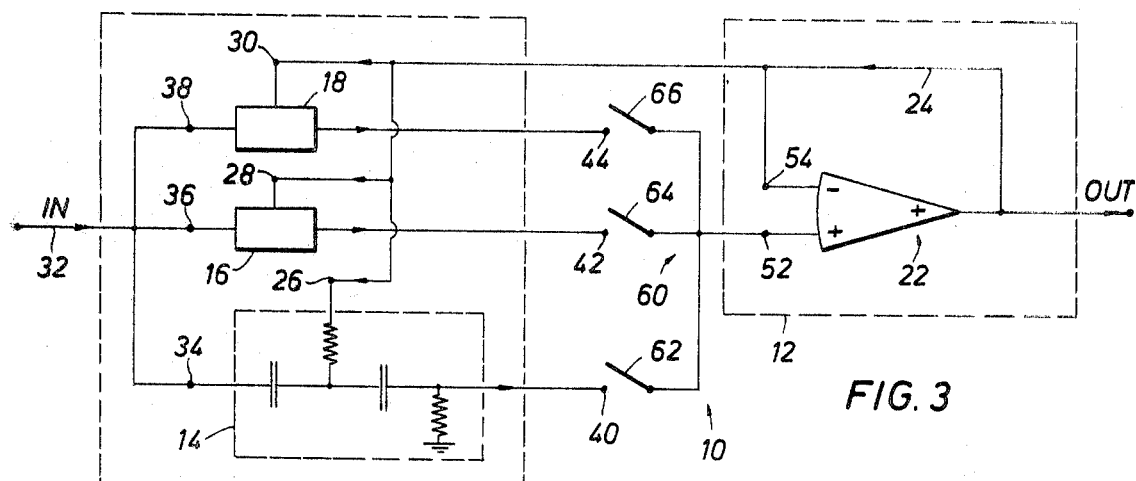
FIG. 3 shows the method and system of the present invention.
Figure 4:
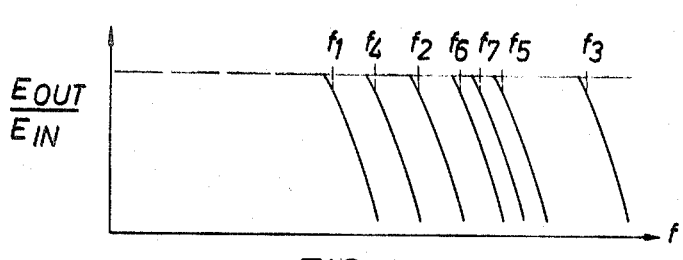
FIG. 4 shows the frequency response curves obtainable with the system of FIG. 3.

In FIG. 3 a multiple-pole switching system, generally designated as 60, is substituted for the single pole switching system 20 of FIG. 1. The number of poles in the switching system 60 is made equal to the number of independent passive filter networks employed. While the multiple pole switching means 60 can be a mechanical or electronic switching system it will be illustrated in connection with a mechanical switching system which includes three switches 62, 64 and 66 for respectively coupling terminals 40, 42 and 44 to input terminal 52 of the operational amplifier 22. Switches 62, 63 and 66 can be manually operated independently or in parallel groups.

It can be easily shown that when N passive filter networks, such as 14–18, are employed, the number of possible distinct switching combinations will be $(2^N-1)$. Moreover, it can also be experimentally shown that when a passive filter network which yields a cutoff frequency $f_1$ and another passive filter network which yields a cutoff frequency $f_2$ are connected in parallel, the resultant parallel combination will yield a cutoff frequency $f_3$ which can be made to approximate the average sum of $f_1$ and $f_2$, that is $f_3=(f_1+f_2)/2$. In operation, with this invention and using three passive filter networks 14, 16 and 18 it is possible to obtain seven distinct cutoff frequencies ranging from $f_1$ to $f_7$ as illustrated in table A, where "$f_1//f_2$" means that network 14 is connected in parallel with network 16, by closing switches 62 and 64 and leaving switch 66 open. The new passive filter network unit, formed of independent passive filter networks 14 and 16, will yield a cutoff frequency $f_4$. Switches 62, 64 and 66 are normally open.

TABLE A

| Prior art | | Invention | | |
|---|---|---|---|---|
| Number of cut-off frequencies | Example, f in Hz | Number of cut-off frequencies | Switches closed | Example, f in Hz |
| $f_1$ | 10 | $f_1$ | 62 | 10 |
| $f_2$ | 14 | $f_2$ | 64 | 14 |
| $f_3$ | 22 | $f_3$ | 66 | 22 |
| | | $f_4=f_1//f_2=\frac{f_1+f_2}{2}$ | 62, 64 | 12 |
| | | $f_5=f_2//f_3=\frac{f_2+f_3}{2}$ | 64, 66 | 18 |
| | | $f_6=f_1//f_3=\frac{f_1+f_3}{2}$ | 62, 66 | 16 |
| | | $f_7=f_1//f_2//f_3=\frac{f_1+f_3}{2}$ | 62, 64, 66 | 17 |

Thus, in accordance with this invention for a number N of independent passive networks $(2^N-1)$ combinations are possible, of which $(2^N-1-N)$ are parallel combinations obtainable in addition to the N combination provided by the prior art. Each independent combination provides a distinct cutoff frequency.

What we claim is:

1. In a method for selectably providing in a filter system a number N of cutoff frequencies by independently connecting each of a number N of independent passive networks to an amplifier, each network having a characteristic cutoff frequency, the amplifier having a feedback path between the output of the amplifier and each passive network, the improvement which includes the steps of:
   connecting one of said passive networks to the input of said amplifier, and
   connecting at least one other of said passive networks in at least one parallel combination with said one passive network, thereby obtaining a distinct third cutoff frequency which is different from the characteristic cutoff frequencies of the individual passive networks forming the parallel combination and is a function of said characteristic cutoff frequencies.

2. The method of claim 1 wherein said number N is greater than two and the number of selectable parallel combinations is equal to $(2^N-1-N)$ thereby providing up to $(2^N-1-N)$ distinct cutoff frequencies, one distinct cutoff frequency for each parallel combination in addition to the N cutoff frequencies obtainable by independently connecting each passive network to the input of the amplifier.

3. In a filter system comprising a number N of independent passive networks,
   each passive network having an input terminal, an output terminal and a feedback terminal and being characterized by a characteristic cutoff frequency;
   an amplifier having an input terminal and an output terminal; and
   means connecting the feedback terminal of each passive network to the output terminal of said amplifier, the improvement comprising;
   coupling means adapted to selectively couple each output terminal of each passive network to the input terminal of said amplifier and to the output terminal of the other passive network, and
   said coupling means being adapted to couple each of said passive networks to said amplifier independently or in parallel combination, thereby allowing said filter system to provide (2N−1) distinct cutoff frequencies.

4. The filter system of claim 3 wherein, said coupling means is a switch having N poles, each pole being adapted to indepedently couple the output terminal of each passive network to the input terminal of said amplifier and to one or more of the output terminals of the other passive networks.

* * * * *